United States Patent
Giles et al.

(10) Patent No.: US 10,498,660 B2
(45) Date of Patent: Dec. 3, 2019

(54) SYSTEMS AND METHODS FOR BANDWIDTH ESTIMATION IN OSCILLATING NETWORKS

(71) Applicant: ECHOSTAR TECHNOLOGIES L.L.C., Englewood, CO (US)

(72) Inventors: Steven Giles, Orem, UT (US); Kyle Powell, Orem, UT (US); Herrick Muhlestein, Englewood, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/395,079

(22) Filed: Dec. 30, 2016

(65) Prior Publication Data

US 2017/0195235 A1 Jul. 6, 2017

Related U.S. Application Data (60) Provisional application No. 62/273,664, filed on Dec. 31, 2015.

(51) Int. Cl.

| | |
|---|---|
| *H04L 12/24* | (2006.01) |
| *H04L 12/26* | (2006.01) |
| *H04L 12/815* | (2013.01) |
| *G06N 20/00* | (2019.01) |
| *H04L 12/841* | (2013.01) |

(52) U.S. Cl.
CPC .......... *H04L 47/225* (2013.01); *G06N 20/00* (2019.01); *H04L 41/0896* (2013.01); *H04L 41/147* (2013.01); *H04L 41/16* (2013.01); *H04L 43/0894* (2013.01); *H04L 47/28* (2013.01)

(58) Field of Classification Search
CPC . G06N 99/005; H04L 41/0896; H04L 47/225; H04L 47/28; H04L 41/147; H04L 41/16; H04L 43/0894
See application file for complete search history.

(56) References Cited

U.S. PATENT DOCUMENTS

| | | | |
|---|---|---|---|
| 6,810,356 B1 | 10/2004 | Garcia-Franco et al. | |
| 8,396,983 B1 * | 3/2013 | Inskip | H04L 29/06517 709/203 |
| 2006/0291391 A1 * | 12/2006 | Vasseur | H04L 45/02 370/235 |

(Continued)

OTHER PUBLICATIONS

Tricha Anjali, et al., "A New Path Selection Algorithm for MPLS Networks Based on Available Bandwidth Estimation," 2002, pp. 205-214, vol. 2511, Springer-Verlag Berlin Heidelberg.

(Continued)

*Primary Examiner* — Robert M Morlan
(74) *Attorney, Agent, or Firm* — Lorenz & Kopf LLP (57) ABSTRACT

A method for estimating bandwidth associated with an oscillating network includes determining a set of first average bandwidths within a corresponding set of first sliding windows, wherein each of the first sliding windows has a first duration. A second sliding window is defined such that it includes the set of first sliding windows, the second sliding window having a second duration that is larger than the first duration. The system then determines whether a bandwidth oscillation (as illustrated) is occurring based on the first set of first average bandwidths within the second sliding window.

19 Claims, 4 Drawing Sheets

(56) References Cited

U.S. PATENT DOCUMENTS

| | | | |
|---|---|---|---|
| 2011/0258338 A1* | 10/2011 | Vass | H04N 7/148 |
| | | | 709/233 |
| 2012/0307636 A1* | 12/2012 | Song | H04L 47/11 |
| | | | 370/235 |
| 2012/0331106 A1* | 12/2012 | Ramamurthy | H04N 21/23432 |
| | | | 709/218 |
| 2014/0222997 A1 | 8/2014 | Mermoud et al. | |

OTHER PUBLICATIONS

European Patent Office International Searching Authority, International Search Report and Written Opinion for International Application No. PCT/US2016/069387, dated Mar. 27, 2017.

* cited by examiner

SYSTEMS AND METHODS FOR BANDWIDTH ESTIMATION IN OSCILLATING NETWORKS

CROSS-REFERENCE TO RELATED APPLICATIONS

This application claims priority to Provisional Patent Application No. 62/273,664, filed Dec. 31, 2015, the contents of which are hereby incorporated by reference.

TECHNICAL FIELD

The present disclosure generally relates to data communication over a network. More particularly, the following discussion relates to systems, methods, and devices for more accurately estimating the change of bandwidth over such networks.

BACKGROUND

It is known that networks (such as packet-switched networks) experience changes in bandwidth that can affect user experience. This is most notable in cases where a user is streaming media content (such as movies, television programming, etc.) over a network, such as 3G/4G and lossy WiFi networks. These bandwidth changes often exhibit an "oscillating" pattern—i.e., increasing and decreasing in a roughly repetitive rather than a random pattern. Such networks may be referred to, in general, as "oscillating networks," even though they do not experience simple sinusoidal oscillations of bandwidth.

Currently known methods for estimating bandwidth in oscillating networks involve utilizing sliding widow averages—i.e., looking at the number of bits received within a predetermined window of time (e.g., about 10 seconds) and using the average value of the bandwidth within that predetermined time to predict future bandwidth. Unfortunately, oscillating networks may vary over an interval that is significantly larger than the length of the first window, for example, over 15 or 30 second intervals. As a result, the bandwidth estimation may not accurately predict the actual future bandwidth experienced during streaming. For example, if the system is approaching a peak, it might select a bit rate for the peak. On the other hand, the system may be on a decline towards the next oscillation. In such a case the system may begin downloading something and then begin to stall, resulting in a poor user experience. Such simple single-window algorithms are best for stable rather than oscillating networks.

Accordingly, there is a need for improved methods of estimating bandwidth in oscillating networks. These and other desirable features and characteristics will become apparent from the subsequent detailed description and the claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

Systems and methods are provided for estimating network bandwidth. In accordance with various embodiments, two sliding windows are employed: a first window that has a first, shorter interval (e.g., about 10 seconds) and a second window that has a longer interval (e.g., about 60-90 seconds). The system captures the average value of the first window (e.g., every 5 seconds) and uses those values over the length of the second interval to detect and predict oscillations within the second window. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
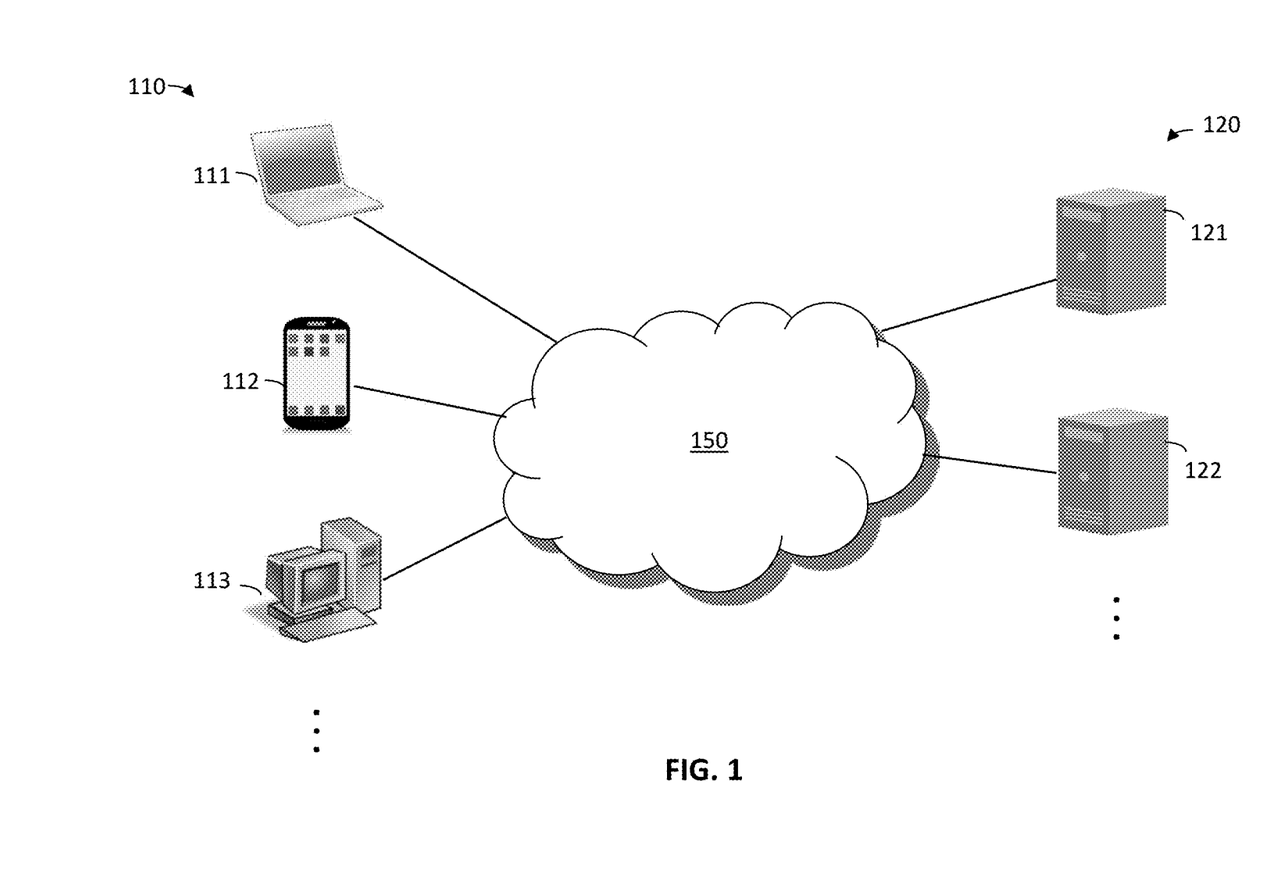
FIG. 1 is a conceptual block diagram illustrating a network in accordance with one embodiment.

Referring to FIG. 1, one or more computing devices (or simply "devices") 110 (e.g., devices 111, 112, and 113) are configured to receive and process media content from one or more content sources (or simply "sources") 120. Devices 110 may correspond to any combination of hardware and software configured to receive and process media content from a content source (e.g., one or more of content servers 120), including, for example, a mobile telephone, a computer system (such as desktop computer, laptop computer, tablet computer, or the like), a set top box, a television monitor, a place-shifting device, a television receiver, a dedicated media player, or the like. Similarly, sources 120 (e.g., 121 and 122) include any combination of hardware and software configured to provide content (e.g., audiovisual content) to devices 110 over network 150. While the environment illustrated in FIG. 1 is shown as a single network 150, in practice the environment may include any number of wired and/or wireless network operating within the geographic proximity of a home, office or other structure and that are generally under the control of a single user, family or operator (e.g., a WLAN, the Internet, and the like).

Figure 2:
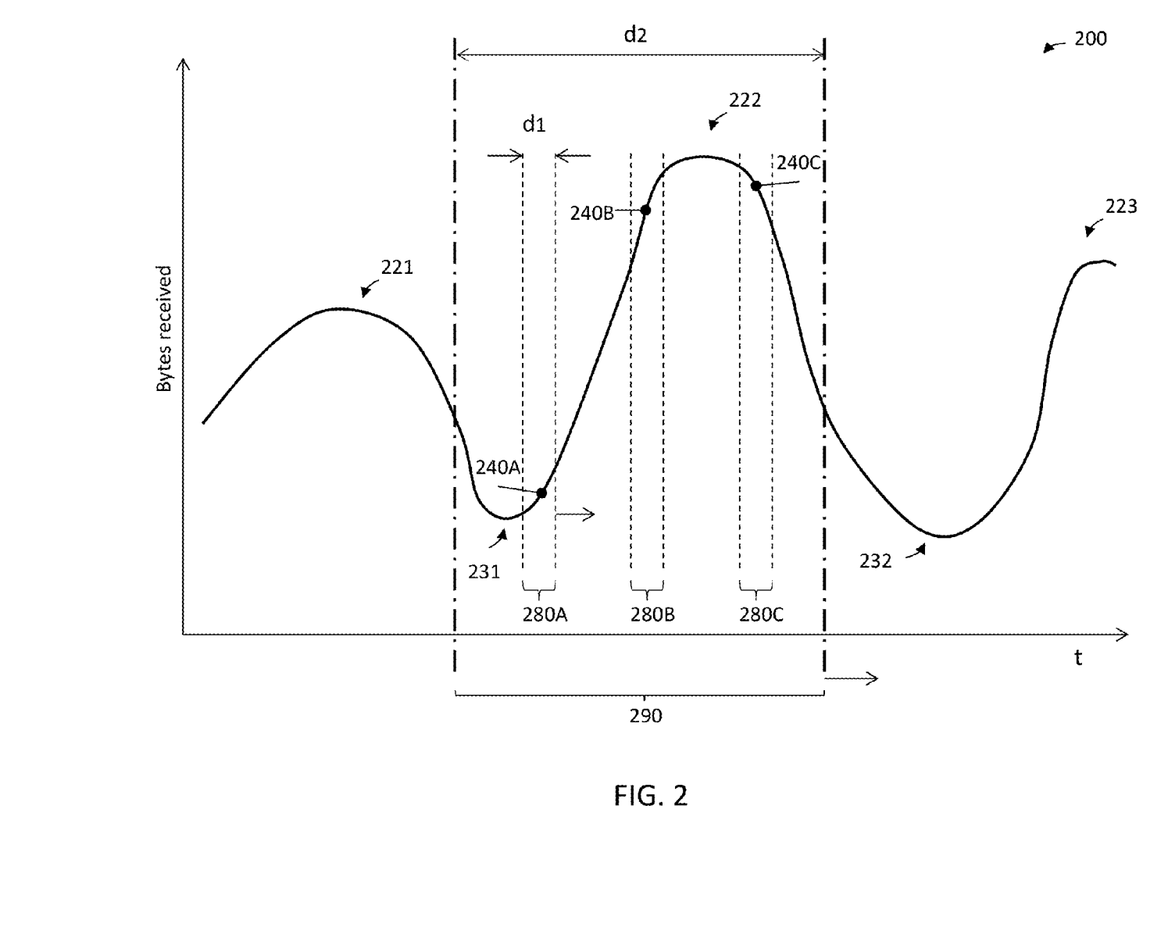
FIG. 2 is a graph illustrating the bandwidth of an oscillating network in accordance with one illustrative example.

As mentioned briefly above, network 150 may be subject to changes in bandwidth over time that can affect the viewing experience of users who are streaming content from media sources 120 via devices 110. FIG. 2 presents a graph 200 illustrating an example of bandwidth oscillations experienced by a sample network (such as network 150 of FIG. 1). In this example, graph 200 depicts, for the purposes of simplicity, a continuous curve of bytes received (substantially equivalent to packets/second or bits/second received) as a function of time. Those skilled in the art will recognize that graph 200 may, in a realistic embodiment, be discretized and/or not "smooth" as it is presented in FIG. 2.

As shown in FIG. 2, the bandwidth variation has three "peaks" 221, 222, and 223, and two "valleys" 231 and 232 therebetween. Thus, the bandwidth "oscillates" up and down as it progresses over time from 221 to 231, 222, 232, 223, etc. Window 280 is shown sliding from left to right, progressing from 280A to 280B and then 280C. Window 280 has a width or interval of d1 in this example. Interval d1 may, for example, be between 5 to 15 seconds long, and in one embodiment is about 10 seconds long.

Point 240A illustrates the average bandwidth for window 280A, point 240B illustrates the average bandwidth for window 280B, and point 240C illustrates the average bandwidth for window 280C. As can be seen, the oscillations of graph 200 are significantly larger than the interval d1. In this example, the oscillations have a period of about eight times the length of d1. As shown, this can have unexpected consequences. For example, if the system is beginning to stream media content at point 240C based on the average bandwidth at that time (which is close to the peak 222), then as the bandwidth reduces over time (toward valley 232) the system will have greatly overestimated the bandwidth available for streaming, and the result will be a negative user experience. On the other hand, the bandwidth available after point 240A will be greatly underestimated.

Thus, in accordance with the present invention, the estimation system (which may be located within one or more of servers 120 of FIG. 1) utilizes a second sliding window (also referred to as an "oscillation window") 290 that is significantly larger than that of the first sliding window 280. Average bandwidth values from sliding window 280 are examined over an interval equal to the second sliding window (e.g., interval d2) to determine whether and to what extent oscillation of graph 200 is likely. In one embodiment, d2 is approximately 5× to 10× the value of d1. In one embodiment, d2 is approximately 6× to 9× the value of d1. In a particular embodiment, d1 is approximately 10 s and d2 is between 60 s and 90s (preferably about 80 s). The invention is not so limited, however.

With continued reference to FIG. 2, the estimation system captures the average values produced by sliding window 280 at predetermined intervals—e.g., about half of the width d1 (e.g., about 5 seconds). These values are examined for the entire interval d2. Using these values, the system predicts (using suitable statistical models and algorithms) whether and to what extent the network is experiencing an oscillation. This estimation model may take a variety of forms. In one embodiment, for example, a time-series prediction model is employed and trained via supervised or unsupervised learning. In one embodiment, an autoregression model is determined, e.g., via least-squares estimation. Other models and techniques may be employed, including for example regression trees, random forests, support vector regression, recurrent neural networks, Bayesian analysis, or the like. In one embodiment, future peaks and valleys are predicted based on a machine learning model. That is, the system may predict that a valley is likely (with some confidence level) to occur at 232, and a peak is likely to occur at 223. A corresponding polynomial, sinusoidal, or other function may then be interpolated between those points.

In some embodiments, a decision tree with low computational complexity is used to quickly predict future peaks and valleys based on past behavior. That is, referring to FIG. 2, the system might determine that, when the average bandwidth at point 240A is very low (relative to some baseline) and the average bandwidth at points 240B and 240C are approximately the same (within some predetermined threshold), then the system might estimate that a valley (e.g., 232) might occur at a future time that is approximately equal to the difference in times between points 240C and 240A. Other such heuristics may be determined through experimentation and/or modeling, as is known in the art.

Figure 4:
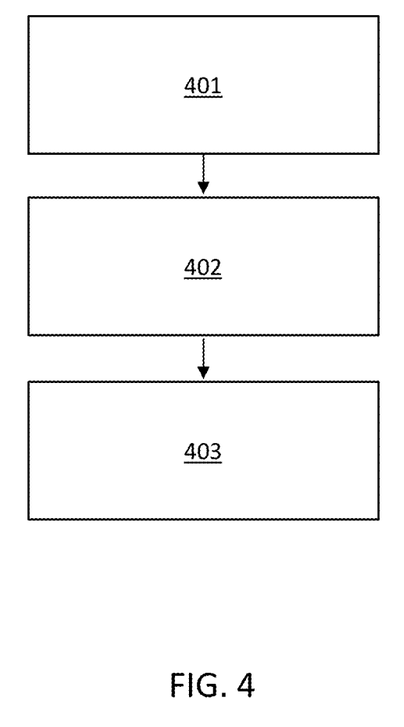
FIG. 4 is a flowchart illustrating, in simplified form, a method in accordance with one embodiment.

FIG. 4 is a simplified block diagram illustrating a method in accordance with one embodiment. In step 401, the system determines the average bandwidth within a first sliding window. At step 402, the system then adds (i.e., also considers) that value to a set of such values captured within a second, larger sliding window. For example, in the case where the first sliding window has an interval of about 10 s, the second sliding window has an interval of about 60 s, and values are captured every 5 seconds, then about 12 of these values are considered within the second sliding window. Accordingly, this set of captured values is then used to determine whether and to what extent an oscillation is occurring or about to occur, and then utilizes that information to better estimate the bandwidth that is likely to be available for a future streaming event (step 403).

Stated another way, a method for estimating bandwidth associated with a network may include the following steps: (1) determining a plurality of first average bandwidths (e.g., 240A-C) within a corresponding plurality of first sliding windows (e.g., 280A-C), each of the first sliding windows having a first duration (d1); (2) defining a second sliding window (e.g., 290) that includes the plurality of first sliding windows (280A-C), the second sliding window having a second duration (d2) that is larger than the first duration (d1); (3) determining whether a bandwidth oscillation (as illustrated) is occurring based on the first plurality of first average bandwidths (240A-C) within the second sliding window (290); and (4) estimating bandwidth at a future time (i.e., prospectively) based on the oscillation determination.

This "future time" will vary depending upon, among other things, d1 and d2. For example, the future time for the prediction may be the right edge of window 290. In this regard, it will be understood that movement to the "right" in this figure corresponds to positive changes in time.

The plurality of first sliding windows (280A-C) may be regularly (i.e., equispaced) or irregularly spaced in time within the second sliding window. Further, first sliding windows 280A-C may be substantially symmetrically placed within second sliding window 290 (as shown in FIG. 2), or placed at any suitable, non-symmetrical locations.

The future time might extend farther, however, as indicated by the arrow in FIG. 2 (e.g., to the local minimum at 232). In one embodiment, the future time is between the rightmost edge of the second window 290 and a width (i.e., time) equal to the width of window 290. In another embodiment, the future time is between the rightmost edge of the second window 290 and a width equal to approximately half of window 290.

Figure 3:
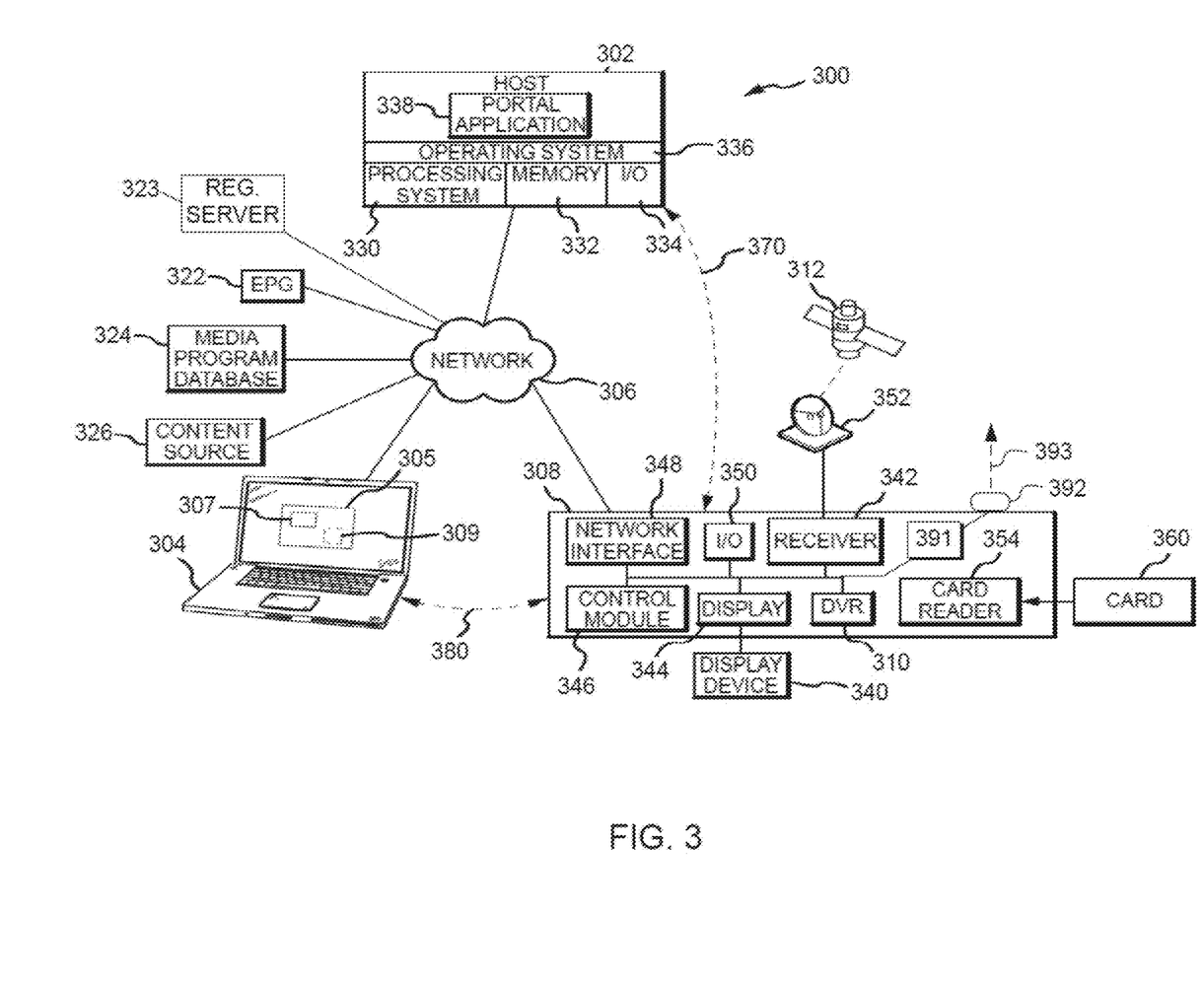
FIG. 3 is a block diagram illustrating an example place-shifting system in which the present embodiments may be implemented.

The above systems and methods may be implemented in the context of a wide variety of entertainment devices and systems. FIG. 3 depicts one, non-limiting, example: a system 300 for placeshifting or otherwise transferring data or content, such as a media program (or media content), from a source electronic device 308 to a destination electronic device 304 over a network 306 for presentation to a user (or viewer) on the destination electronic device 304. Thus, server 121 of FIG. 1 may be implemented as content source 326, network 150 of FIG. 1 may correspond to network 306 of FIG. 3, and computing device 111 of FIG. 1 may correspond to device 308 (or device 304). For purposes of explanation, but without limitation, the source device 308 may be alternatively referred to herein as a media device or a placeshifting device, and the destination electronic device 304 may be alternatively referred to herein as a playback device or a client device (or client).

The placeshifting system 300 also includes a host server 302 (or host) that communicates or otherwise interacts with the devices 304, 308 over the network 306 to facilitate establishment of a peer-to-peer connection 380 over the network 306, which may be utilized for a placeshifting session, as described in greater detail below. It should be understood that FIG. 3 is a simplified representation of the placeshifting system 300 for purposes of explanation is not intended to limit the subject matter described herein in any way.

In practice, the client device 304 may be any device, component, module, hardware and/or the like that is capable of communicating with the server 302 over network 306. For example, depending on the embodiment, client device 304 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 306 and presenting audio and/or visual content. In this regard, the client device 304 includes a display device, such as a monitor, screen, or another conventional electronic display, capable of graphically presenting visual content, data and/or information that is generated or otherwise provided by an application 305, 307 executing on the client 304. The client device 304 may further include a user input device, such as a keyboard, a mouse, a touchscreen, or the like, capable of receiving input data and/or other information from the user of the client device 304. The client device 304 also includes a processing system and a data storage element (or memory) that is coupled to or otherwise accessed by the processing system and stores programming instructions that, when read and executed, cause the processing system of the client device 304 to generate one or more applications 305, 307, 309 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 304 may reside at a geographic location that is remote or otherwise physically distinct from the geographic location of the media device 308. In this regard, the media device 308 may have an essentially fixed or permanent geographic location, whereas the geographic location of the client 304 may be transient or otherwise variable with respect to the location of the media device 308. For example, the media device 308 may be realized as a set-top box or a similar device that resides at a user's home for providing media content to the user's television or other home display device 340, while the client 304 is realized as a portable electronic device, such as a mobile phone or other mobile computing device, that moves about with the user.

In the embodiment shown in FIG. 3, client device 304 executes a conventional browser or other client application 305 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, client 304 further includes a media player application 307. The media player 307 may be a standalone media player, or the media player 307 may be implemented as a plugin or other applet that runs within the client application 305 as desired. In some embodiments, media player 307 is initially obtained from a networked host, such as server 302. The media player 307 may be retrieved on an as-needed basis in some embodiments, or may be stored at client 304 for subsequent execution.

With continued reference to FIG. 3, in exemplary embodiments, media device 308 is any form of device, module, component, hardware and/or the like capable of receiving and processing media content from one or more content sources. For example, in some embodiments, media device 308 is a set-top box (STB) or similar system that is able to receive television programming and/or to record certain programs that can be viewed on a display device 340, such as a television, monitor, liquid crystal display (LCD), light emitting diode (LED) display, plasma display, or the like. Exemplary embodiments of media device 308 will therefore include or otherwise be coupled to a receiver interface 342 for receiving satellite, cable and/or broadcast programming signals from broadcast sources 312, as well as a data storage medium 310 (e.g., a hard disk, flash memory, or another suitable non-volatile data storage element) to support a digital video recorder (DVR) feature and/or functionality, a display interface 344 for providing imagery to the display device 340, and a control module 346 that directs the operations of the media device 308 as appropriate. For convenience, but without limitation, the data storage medium 310 is alternatively referred to herein as a DVR. Media device 308 may also include one or more interfaces 348 to the network 306 and/or an input/output interface 350 to a remote control or other device for providing user inputs to the media device 308, as appropriate. For example, the network interface(s) 348 of the media device 308 may include an interface or port for a wired communications layer (e.g., an Ethernet port or adapter), an interface for a wireless communications layer (e.g., an IEEE 802.11-compatible transceiver), and/or the like.

The components in media device 308 may be provided within a common chassis or housing as depicted in FIG. 3, although equivalent embodiments may implement media device 308 with any number of inter-connected but discrete components or systems. For example, in some embodiments, the media device 308 may be realized as a combination of a STB and a placeshifting device, wherein some features of the media device 308 (e.g., the DVR 310, the receiver 342, the display interface 344, and/or I/Os 350) are implemented by the STB and other features of the media device 308 (e.g., the network interface 348) are implemented by the placeshifting device, wherein the placeshifting device works in conjunction with the STB to shift the viewing experience from a home television (e.g., display device 340) to a viewing display on the client device 304 that is accessed via the network 306. Examples of placeshifting devices that may be used in some embodiments of media device 308 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 308 may be a hybrid DVR and/or receiver, for example, that also provides transcoding and placeshifting features. It should be appreciated that FIG. 3 depicts merely one exemplary embodiment of a media device 308, and in practice, the media device 308 may be logically and physically implemented in any manner to suit the needs of a particular embodiment.

In the exemplary embodiment illustrated in FIG. 3, media device 308 is capable of receiving digital broadcast satellite (DBS) signals transmitted from a broadcast source 312, such as a satellite, using an antenna 352 that provides received signals to the receiver 342. Equivalent embodiments, however, could receive programming at receiver 342 from any sort of cable connection, broadcast source, removable media, network service, external device and/or the like. In some embodiments, the media device 308 may also include an access card interface or card reader 354 adapted to receive an access card 360 (or viewing card) configured to ensure that the viewer is authorized to view media content provided to the primary display device 340. In this regard, the access card 360 includes unique identification information associated with a particular subscriber to the broadcast content source 312 or otherwise includes subscription information that facilitates receiving and/or decoding media content provided by the broadcast content source 312.

The DVR 310 feature stores recorded programming (e.g., recorded broadcast programming received via receiver 342) on a hard disk drive, memory, a networked server, or other storage medium as appropriate in response to user/viewer programming instructions, wherein the recorded programming may be subsequently viewed via the media device 308, either on display device 340 or client device 304 via network 306. Content stored in DVR 310 may be any sort of file-based programming or other content that is accessible to media device 308. In various embodiments, in addition to storing broadcast programming, the DVR 310 may also store programming received from other sources not illustrated in FIG. 3, such as, for example, programming downloaded from an on-demand programming source or an online programming source. Additionally, content in DVR 310 may be stored in any sort of compressed or uncompressed format, as desired, and may be encoded or transcoded as desired for effective receipt, storage, retrieval and playing.

The control module 346 is any sort of hardware, circuitry, processing logic and/or other components capable of directing the operations of media device 308. In various embodiments, control module 346 includes software or firmware logic and/or other programming instructions residing in memory and executing on any sort of processing system, such as any sort of processor, microprocessor, microcontroller, digital signal processor or the like. The instructions, when read and executed, cause the control module 346 to perform various tasks, functions, processes and/or operations and otherwise support the subject matter described herein. In various embodiments, the control module 346 is based upon a "system on a chip" (SoC) implementation that incorporates a hybrid microcontroller with memory, input/output and other features to perform the various signal processing and other actions of media device 308. Other embodiments may implement control module 346 and/or the other features of media device 308 with any number of discrete and/or integrated processing components (e.g., any sort of microprocessor or microcontroller), memories, input/output features and/or other features as desired. The control module 346 communicates with the network interface 348 to establish a peer-to-peer connection 380 to the client device 304 over the network 306 and support streaming of media programs (e.g., from the DVR 310 or the receiver 342) to the client device 304 over the network 306 via the peer-to-peer connection 380, as described in greater detail below.

In the embodiment of FIG. 3, the network 306 is any communications network (or a combination of communications networks) capable of transmitting data between devices within the system 300. In various embodiments, network 306 includes any number of public or private data connections, links or networks supporting any number of communications protocols. Network 306 may include the Internet, for example, or any other network. Such networks may be based upon TCP/IP or other conventional protocols, although other embodiments may use any type of alternate or successor protocols, as desired. In various embodiments, network 306 may also incorporate a wireless and/or wired telephone network, such as a cellular communications network for communicating with mobile phones, personal digital assistants, and/or the like. Various embodiments of network 306 may also incorporate any sort of wireless or wired local area networks (LANs), wide area networks (WAN), or the like.

In the illustrated embodiment of FIG. 3, the server 302 may be realized as one or more server computers or other device(s) coupled to the network 306 and capable of interacting with the devices 304, 308 to facilitate communications between the client device 304 and the media device 308 associated with the user or operator of the client 304. The server 302 may be implemented with a server computer system or data processing system that is based upon any processor, architecture and/or operating system, and will typically be implemented using a processing system 330, memory 332, and input/output features 334. Various embodiments may be implemented using dedicated or shared hardware servers; other implementations may make use of virtual server features as part of a "cloud computing" service, such as any of the cloud computing services provided by any number of providers.

While FIG. 3 illustrates a single server 302, many practical embodiments of the system 300 may provide a cluster or other collection of multiple host servers 302 to support any desired number of simultaneous communications with multiple clients 304 and/or multiple media devices 308. This cluster may also incorporate appropriate routing, load balancing, access and security mechanisms and or any number of other features. In various embodiments, each server 302 is an actual or virtual computer system executing an operating system 336 in conjunction with the processing system 330, memory 332 and/or I/O features 334 to provide a computing core that is capable of executing a portal application 338, as well as any number of daemons, processes, applications or other modules as desired. For example, a portal application 338 could execute as a daemon on the server 302, with connections to separate clients 304 being managed as separate processes or instances that communicate with portal application 338 using features provided by operating system 336. In one or more embodiments, the memory 332 stores programming instructions that, when read and executed, cause the processing system 330 to create, generate, or otherwise facilitate the portal application 338 and perform various tasks, functions, processes and/or operations described herein. In this regard, the memory 332 represents any non-transitory short or long term data storage element or other computer-readable media capable of storing programming instructions for execution by or on the processing system 330.

The user of the client 304 is able to connect to the portal application 338 supported by host 302 via the network 306, for example, by directing the client application 305 to a URL or other network address associated with host 302 and/or portal application 338. In exemplary embodiments, after the user is successfully authenticated by the portal application 338, and he gets the connection parameter associated with device 308. Using the connection info client 305 establish a channel 380 which is used to stream media data and to and fro communication. Thereafter, the client 304 utilizes the connection 380 to obtain, from the media device 308 via the network 306, information about programming stored at the media device 308 and available for placeshifting to the client device 304, such as, for example, a listing of the media programs stored on DVR 310. It should be noted that although FIG. 3 depicts the network connection 380 as being between the host 304 and the media device 308, in practice, the placeshifting system 300 may include one or more intermediary components (e.g., one or more message servers or relay server) configured to establish, facilitate, or otherwise support the connection 380.

Server 302 is coupled to an electronic program guide 322, which may be realized as a server, a database, or another device operating on the network 306 that maintains information pertaining to current and/or future broadcasts (or airings) of media programs that are available to be received from broadcast source 312 (e.g., by the media device 308 via receiver 342 and/or antenna 352). The server 302 and/or the portal application 338 may obtain information pertaining to current and/or future broadcasts (or airings) of media programs from the electronic program guide 322 and generate or otherwise provide a program guide graphical user interface (GUI) display on the client device 304 (e.g., within client application 305) that indicates media programs that are or will be available for streaming from the media device 308. The user of the client device 304 may manipulate or otherwise utilize the graphical user interface (or the graphical user interface elements contained therein) to select or otherwise identify media programs for streaming to the client device 304 and/or recording to the DVR 310. The user may pause or otherwise stop presentation of the streamed media program and manipulate or otherwise operate the client application 305 to transmit or otherwise provide, via the network 306, a request for content to a third-party content source 326 (e.g., a third-party website). The third-party content source 326 responds to the request by transmitting or otherwise providing content to the client device 304 via the network 306.

In the illustrated embodiment of FIG. 3, the placeshifting system 300 also includes a media program database 324 that includes verified or validated metadata and/or other descriptive information for a vast array of media programs. For example, the media program database 324 may contain metadata and/or other descriptive information pertaining to substantially all of the media programs that may be available from one or more content sources within placeshifting system 300 (e.g., information pertaining to any media programs that have previously been aired by a broadcast source 312, along information pertaining to any movie that has been presented in theaters, made available on-demand, or released for individual use (e.g., on digital video disc (DVD) or the like)). In exemplary embodiments, for each media program having a record (or entry) in the media program database 324, the media program database 324 maintains a media data object that includes one or more fields of metadata associated with that media program along with one or more fields of program identifiers that may be used to identify that media program record. In this regard, the program guide 322 and the media program database 324 may utilize the same program identifiers to uniquely identify each media program.

Placeshifting system 300 may also include a registration server 323, as illustrated. After authentication and connection parameters are provided by server 302, either server 302 or 305 can fetch the appropriate registration information. The media device may registers itself with registration server 323 over network 306. As part of registration, the media device communicates its own unique ID and a port that the device "listens" to. The registration server 323 knows the device ID, its public IP address, and the port number with which it listens. This process may be periodic so that any change in the public IP address or port would be reflected in registration server 323.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The invention claimed is:

1. A method for estimating future bandwidth availability of a network, the method carried-out utilizing a server in communication with a media device over the network, the method comprising:
   determining, with a processor contained in the server, a plurality of average bandwidths within a corresponding plurality of first sliding windows while the server streams media content to the media device, each of the first sliding window having a first duration;
   defining second sliding windows that comprise a corresponding first sliding window of the corresponding plurality of first sliding windows;
   capturing, in a memory of the server, the plurality of the average bandwidths of each of the first sliding windows occurring within the second sliding window wherein each of the second sliding window has a second duration that is larger than the first duration of each first sliding window of the corresponding plurality of first sliding windows;
   analyzing, with the processor, the plurality of the average bandwidths to predict a future bandwidth peaks and a future bandwidth valleys resulting from bandwidth oscillations of the network, wherein the analysis further comprises:
      identifying, at the processor, the first average bandwidths having a value less than a baseline value,
      identifying, at the processor, second average bandwidths occurring after the first average bandwidth and having a higher value than values of the first average bandwidths,
      determining, at the processor, whether the bandwidth oscillations are occurring based on the plurality of average bandwidths within the second sliding windows, and
      predicting, at the processor, when the future bandwidth valleys occur based on the bandwidth oscillation determinations from a time period after the second average bandwidth, the time period equal to a difference in times at which the first average bandwidths and the second average bandwidths occurred;
interpolating, with the processor, a function between the future bandwidth peaks and the future bandwidth valleys;
utilizing the function to estimate future bandwidth availability of the network as the server continues to stream the media content to the media device, while adjusting a bitrate of the streaming content based on the estimated future bandwidth availability of the network; and
repeating the steps of determining, capturing, analyzing, interpolating, and utilizing as the server continues to stream the media content to the media device over the network to prevent at least an over-estimating of the future bandwidth available for streaming as the bandwidth reduces over time towards the future bandwidth valleys.

2. The method of claim 1, wherein the second duration is 5 times to 10 times longer in time than the first duration.

3. The method of claim 2, wherein the second duration is 6 times longer in time than the first duration.

4. The method of claim 3, wherein the first duration is 10 seconds and the second duration is 60 seconds.

5. The method of claim 1, wherein the processor analyzes the plurality of average bandwidths to predict the future bandwidth peaks and the future bandwidth valleys utilizing a machine learning model.

6. The method of claim 5, wherein the machine learning model is a time-series prediction model, and the machine learning model is trained via unsupervised learning.

7. The method of claim 1, wherein the processor predicts the future bandwidth peaks to occur at a future time greater than at a time at a rightmost edge of particular second sliding windows.

8. The method of claim 7, wherein the future time is less than the sum of times at the rightmost edge of particular second sliding windows and a length of the duration of time of particular second sliding windows.

9. A media device, comprising:
a network interface configured to enable the media device to communicate with a server over a network;
memory containing machine-readable software instructions; and
a processor coupled to the network interface and to the memory the processor, when executing the machine-readable software instructions, causing the media device to:
receive a plurality of packets over the network and determine a bandwidth of the network;
determine a plurality of average bandwidths within a corresponding plurality of first sliding windows having first durations;
define a plurality of second sliding windows which each include a corresponding first sliding window of the corresponding plurality of first sliding windows;
capturing, in the memory, the plurality of the average bandwidths occurring for each of the first sliding windows within the second sliding windows having a second duration that is larger than the first duration;
analyze the plurality of the average bandwidths within the second sliding window to predict a future bandwidth peak and a future bandwidth valley resulting from bandwidth oscillations of the network, the analysis further comprises to:
identify a first average bandwidth having a value less than a baseline value,
identify second average bandwidths occurring after the first average bandwidths and having higher values than values of the first average bandwidths, and
predict when the future bandwidth valleys occur from a time period after the second average bandwidths, the time period equal to a difference in times at which the first average bandwidths and the second average bandwidths have occurred;
interpolating a function between the future bandwidth peaks and the future bandwidth valleys;
utilizing the function to estimate future bandwidth availability of the network as the server continues to stream the media content to the media device; and
repeat the steps of receiving, determining, capturing, analyzing, interpolating and utilizing as the server continues to stream the media content to the media device over the network to prevent at least an over-estimate of the future bandwidth available to stream as the bandwidth reduces over time toward the future bandwidth valley.

10. The media device of claim 9, wherein the second duration is 5 times to 10 times greater in time than the first duration.

11. The media device of claim 10, wherein the second duration is 6 times greater in time than the first duration.

12. The media device of claim 11, wherein the first duration is 10 seconds and the second duration is 60 seconds.

13. The media device of claim 9, wherein the processor analyzes the predetermined number of average bandwidths to predict at least one future bandwidth peak and at least one future bandwidth valley utilizing a machine learning model implemented by the machine-readable software instructions.

14. The media device of claim 13, wherein the machine learning model is a time-series prediction model, and the machine learning model is trained via unsupervised learning.

15. The media device of claim 9, wherein the processor predicts the future bandwidth peak to occur at a the future time, which is less than the sum of times at the rightmost edge of the second sliding window and the duration of time of the second sliding window.

16. A computer-implemented method for estimating bandwidth associated with a network, the method carried-out utilizing a media device when receiving streaming media content from a server over the network, the method comprising:
determining, with a processor contained in the media device, a plurality of average bandwidths of the network within a corresponding plurality of first sliding windows while the server streams media content to the media device, the plurality of first sliding windows, each having a first duration;
defining second sliding windows including one corresponding first sliding window of the corresponding plurality of first sliding windows;
capturing, in a memory of the media device, a plurality of the average bandwidths of of each set of first sliding windows occurring within the second sliding windows wherein the second sliding windows has a second duration with a value that is larger than value of the first duration;
analyzing, with the processor, the plurality of the average bandwidths to predict a future bandwidth peak and a future bandwidth valley resulting from bandwidth oscillations of the network wherein the analysis further comprises:

identifying, at the processor, a first average bandwidth having a value less than a baseline value, identifying, at the processor, a second average bandwidth occurring after the first average bandwidth and having a higher value than values of the first average bandwidths, and predicting, at the processor, when the future bandwidth valleys occur from a time period after the second average bandwidth, the time period equal to a difference in times at which the first average bandwidths and the second average bandwidths occurred;

interpolating, with the processor, a function between the future peak bandwidth peaks and the future bandwidth valleys;

utilizing the function to estimate future bandwidth availability of the network as the server continues to stream the media content to the media device; and repeating the steps of determining, capturing, analyzing, interpolating, and utilizing as the server continues to stream the media content to the media device over the network.

17. The computer-implemented method of claim 16, wherein the duration of time of the plurality of the first sliding windows is $\frac{1}{10}$ to $\frac{1}{5}$ of the duration of time of the second sliding windows.

18. The computer-implemented method of claim 16, wherein the processor analyzes the plurality of average bandwidths to predict a future bandwidth peaks and a future bandwidth valleys utilizing a time-series machine learning model.

19. The method of claim 1, wherein interpolating comprises interpolating a polynomial function between the future bandwidth peaks and the future bandwidth valleys.

* * * * *